United States Patent
Tandler et al.

[11] Patent Number: 5,835,264
[45] Date of Patent: Nov. 10, 1998

[54] METHOD FOR GENERATING A STEREOSCOPIC IMAGE AND AN ARRANGEMENT FOR STEREOSCOPICALLY VIEWING AN OBJECT

[75] Inventors: Hans Tandler; Gudrun Nordt; Reed Werlich; Karl-Heinz Geier; Johannes Knoblich; Günter Schöppe, all of Jena, Germany

[73] Assignee: Carl Zeiss Jena GmbH, Jena, Germany

[21] Appl. No.: 610,455

[22] Filed: Mar. 4, 1996

[30] Foreign Application Priority Data

| Mar. 2, 1995 | [DE] | Germany | 195 07 344.4 |
| Nov. 17, 1995 | [DE] | Germany | 195 42 827.7 |
| Feb. 22, 1996 | [DE] | Germany | 196 06 424.4 |

[51] Int. Cl.$^6$ ............ G02B 21/06; G02B 21/22; G02B 27/22; H04N 13/00
[52] U.S. Cl. ............ 359/377; 359/464; 359/388; 348/49; 348/56; 348/57
[58] Field of Search ............ 359/377, 376, 359/371, 464, 465, 388, 386, 389; 348/49, 55, 56, 57

[56] References Cited

U.S. PATENT DOCUMENTS

| 4,561,731 | 12/1985 | Kley . | |
| 4,654,699 | 3/1987 | Medina . | |
| 4,695,130 | 9/1987 | Medina et al. . | |
| 4,714,319 | 12/1987 | Zeevi et al. | 359/479 |
| 4,806,776 | 2/1989 | Kley . | |
| 4,827,909 | 5/1989 | Kato et al. . | |
| 4,926,257 | 5/1990 | Miyazaki | 359/377 |
| 5,285,196 | 2/1994 | Gale, Jr. . | |
| 5,382,961 | 1/1995 | Gale, Jr. . | |
| 5,444,566 | 8/1995 | Gale et al. . | |

FOREIGN PATENT DOCUMENTS

| 0656554 | 6/1995 | European Pat. Off. . |
| 0664470 | 7/1995 | European Pat. Off. . |
| 3229516 | 2/1984 | Germany . |
| 290278 | 5/1991 | Germany . |
| 4243556 | 6/1992 | Germany . |
| 4311603 | 10/1994 | Germany . |

(List continued on next page.)

OTHER PUBLICATIONS

"Moderne Methoden der Lichtmikroskopie" by G. Göke, Kosmos–Verlag, 1988, pp. 312 to 314.
"Räumliches Sehen im Lichtmikroskop" by R. Wolf et al, Mikrokosmos, vol. 74, 1985, pp. 292 to 297.
"Novel beam–splitting microscope tube for taking stereo–pairs with full resolution Nomarski or phase contrast technique, or with epifluorescence" by R. Wolf et al, Journal of Microscopy, vol. 153, Feb. 1989, pp. 181 to 186.
"3–D Bild ohne Flimmern" by H. Isono et al, Funkschau, 1989.

*Primary Examiner*—Jon W. Henry
*Attorney, Agent, or Firm*—Walter Ottesen

[57] ABSTRACT

The invention is directed to a method and arrangement for generating stereoscopic images of an object. The method includes the steps of illuminating an object with an illuminating beam; masking the illuminating beam to generate a first component beam to illuminate the object at a first angle and provide a first image of the object to a first viewing eye; again masking the illuminating beam to generate a second component beam to illuminate the object at a second angle and to provide a second image of the object to a second viewing eye; and, alternately repeating the last two steps at a frequency above the flicker frequency of the human eye. In the arrangement of the invention, a beam generating device alternately generates first and second illuminating beam components which illuminate the object via illuminating optics at respectively different angles to produce respective images of the object. A directing device for alternately directing the images to the left and right eyes of a viewer at a frequency above the flicker frequency of the human eye.

36 Claims, 11 Drawing Sheets

FOREIGN PATENT DOCUMENTS

| | | |
|---|---|---|
| 4319566 | 12/1994 | Germany . |
| 195 07 344 | 10/1996 | Germany . |
| 195 42 827 | 5/1997 | Germany . |
| 60-241018 | 11/1985 | Japan . |
| 63-200115 | 8/1988 | Japan . |
| WO92/18894 | 10/1992 | WIPO . |
| WO94/02872 | 2/1994 | WIPO . |
| WO95/14952 | 6/1995 | WIPO . |
| WO95/16218 | 6/1995 | WIPO . |
| WO95/27226 | 10/1995 | WIPO . |
| WO95/28662 | 10/1995 | WIPO . |
| WO96/24083 | 8/1996 | WIPO . |

# METHOD FOR GENERATING A STEREOSCOPIC IMAGE AND AN ARRANGEMENT FOR STEREOSCOPICALLY VIEWING AN OBJECT

BACKGROUND OF THE INVENTION

The arrangement of the invention is applicable in conventional transmitted-light microscopes and reflected-light microscopes and especially in single-channel microscopic systems preferably for stereoscopic viewing of a video image.

The known stereoscopic arrangements are based on two separate microscopic beam paths for respective eyes of the viewer. The conventional arrangements are the Greenough type and the Galilei type. Both types have the disadvantage which is the limitation of microscopic resolution so that apertures greater than 0.1 are possible only with substantial complexity. This comes about because large working distances are desired in stereo arrangements and since, for conventional arrangements, only limited aperture space is present because of the following: the required angle for the stereo viewing, the two separate beam paths and the frame parts of the two beam paths with manipulable dimensioning.

It is further known to insert half diaphragms in the form of polarization filters in the condenser of a single-objective microscope in order to obtain a stereoscopic effect. The polarization directions of the polarization filters are mutually perpendicular and correspondingly orientated polarization filters must be provided in the two tubes. In this connection, reference can be made to the "Journal of Microscopy", volume 153, February 1989, pages 181 to 186.

Published German patent application 4,311,603 discloses a stereomicroscope having a high magnification wherein an object translator is provided in the beam path on the object side of a single-objective light microscope in the object plane. A beam switchover device is mounted in the beam path on the image side. Disadvantageous is here the object translator because the movement of the translator can lead to vibrations of the entire microscope, especially for objects having a large mass.

U.S. Pat. Nos. 4,561,731 and 4,806,776 disclose that a pseudo stereoscopic effect can be generated with the aid of a so-called differential polarization illumination. For the illumination, two separate light sources are provided and polarizers are mounted downstream thereof for generating different polarization directions.

U.S. Pat. No. 4,561,731 shows in FIG. 10 thereof and in the description corresponding thereto that a proper stereoscopic image can be generated in that polarizers are mounted in the light path of the oculars and a double refracting plate is mounted between objective and object. The single illuminating beam path is alternately polarized differently.

A similar arrangement is described in PCT patent publication Wo 94/02872. Here too, two light sources and two beam paths are utilized.

This also applies to a surgical microscope disclosed in published German patent application DD-A5 290,278. Two illuminating systems lying diametrically opposite to each other are inclined to the optical axis and the image viewed in the right ocular is assigned to the first illuminating system and the image viewed with the left ocular is assigned to the second illuminating system.

SUMMARY OF THE INVENTION

It is an object of the invention to provide stereoscopic viewing of microscopic images with high resolution in normal transmitted-light microscopes and reflected-light microscopes and especially in single-channel microscopic systems. This object is achieved with only little additional complexity and use of space.

The method of the invention is for generating a stereoscopic image of an object and includes the steps of: illuminating an object with an illuminating beam; masking the illuminating beam to generate a first component beam to illuminate the object at a first angle and provide a first image of the object to a first viewing eye; again masking the illuminating beam to generate a second component beam to illuminate the object at a second angle and to provide a second image of the object to a second viewing eye; and, alternately repeating the last two steps at a frequency above the flicker frequency of the human eye.

The stereoscopic viewing of microscopic images with high resolution is achieved in that a light modulator is used in or almost in the aperture diaphragm plane of the illuminating beam path (or in the image of the entry pupil of the objective). The light modulator shifts the centroid of the illuminating beam path into two positions in accordance with a clock frequency so that the object is illuminated with the maximum possible aperture at the angle required for stereo viewing. Furthermore, means for alternately displaying the two images of the stereoscopic image pair on an image display device are provided. Clocking of the image display device is in synchronism with the clocking of the light modulator and the sequence frequency makes possible a flicker-free image impression. A liquid crystal cell can be advantageously used in one arrangement as a light modulator. It is advantageous to use a liquid crystal cell wherein the ferroelectrical effect is utilized.

Another advantageous light modulator is defined by two gratings having a splitting ratio of 1:1. The gratings are arranged closely one above the other. The configuration of the grating pattern is so made that, for the use in the aperture diaphragm and movement of one of the gratings relative to the other one, the two aperture diaphragm halves must be alternately opened and closed. For use in the binocular tube, the light alternately enters into one or the other outlet of a binocular tube. The grating constant then is so matched that the first diffracting order does not disturb the desired object data.

The light obtained from this arrangement is higher than the light obtained from the variations described above because the polarization foils are not required for the liquid crystal modulation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
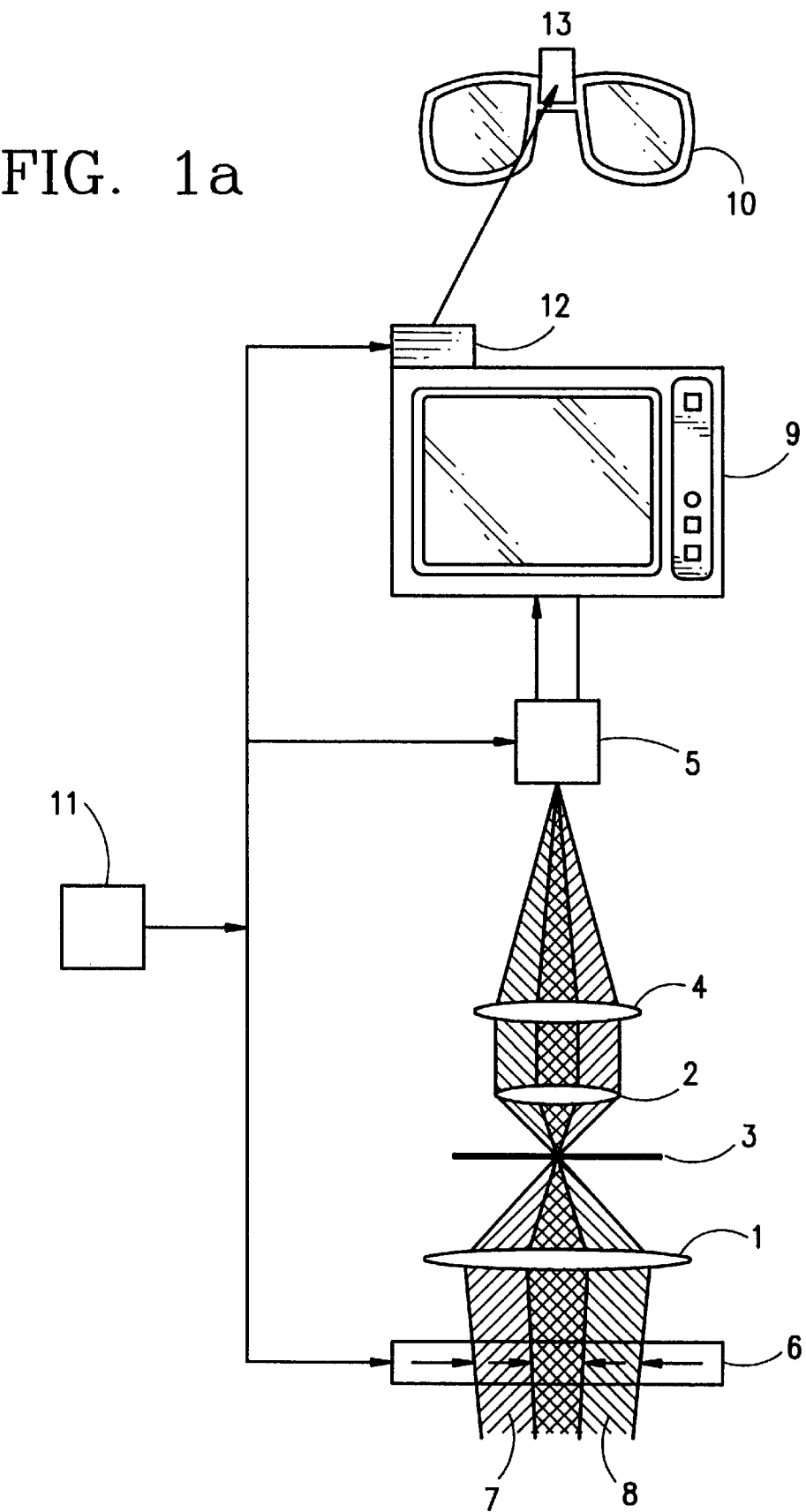
FIG. 1a is a schematic of a microscope arrangement of the invention with transmitted-light illumination.

FIG. 1a shows a microscope according to the invention having transmitted-light illumination. As is conventional, the microscope comprises a light source (not shown), collector, condenser 1 and objective 2. The objective 2 images an image of the object 3 on a video camera 5 via the tube lens and the imaging optic 4. The centroid of the illuminating beam is displaced into two positions in a clocked manner by the light modulator 6 in the plane of the aperture diaphragm (or of the image of the entry pupil of the objective) so that the beams 7 and 8 are formed. In this way, the object is illuminated at the required angle for stereo viewing with the highest possible aperture without the viewing aperture being unnecessarily limited.

A clock generator 11 controls the light modulator 6 and a video camera 5 so that each of the two images of a stereoscopic image pair is recorded. The display of the three-dimensional imaging takes place via an electronic display 9 which is clocked via the video camera 5 to display the two images as televisionary sectional images. The display is viewed with shutter spectacles 10. A transmitter 12 (for example, an LED) on the display transmits light signals controlled by the clock generator 11. These signals are received by a sensor 13 on the shutter spectacles. The sensor 13 controls the switchover of the openings of the shutter spectacles so that each eye (in accordance with the timing of the light modulator) each sees an image of the stereoscopic image pair. The sequence frequency makes possible a flicker-free image impression.

In lieu of the shutter spectacles, the viewer can also wear polarization spectacles when an electronic display is used which has a switchable polarization filter which, in turn, is triggered with the change of the stereoscopic sectional images by the clock generator 11.

In principle, three-dimensional viewing can take place even without video camera and monitor in that the viewer is equipped with shutter spectacles but looks through the oculars of a binocular tube. The clock generator must then synchronously clock the light modulator and the shutter spectacles.

Furthermore, and in a manner known per se, a separate display can be mounted forward of each eye of the viewer. The displays are synchronously clocked by means of a clock generator for light modulation.

Figure 1B:
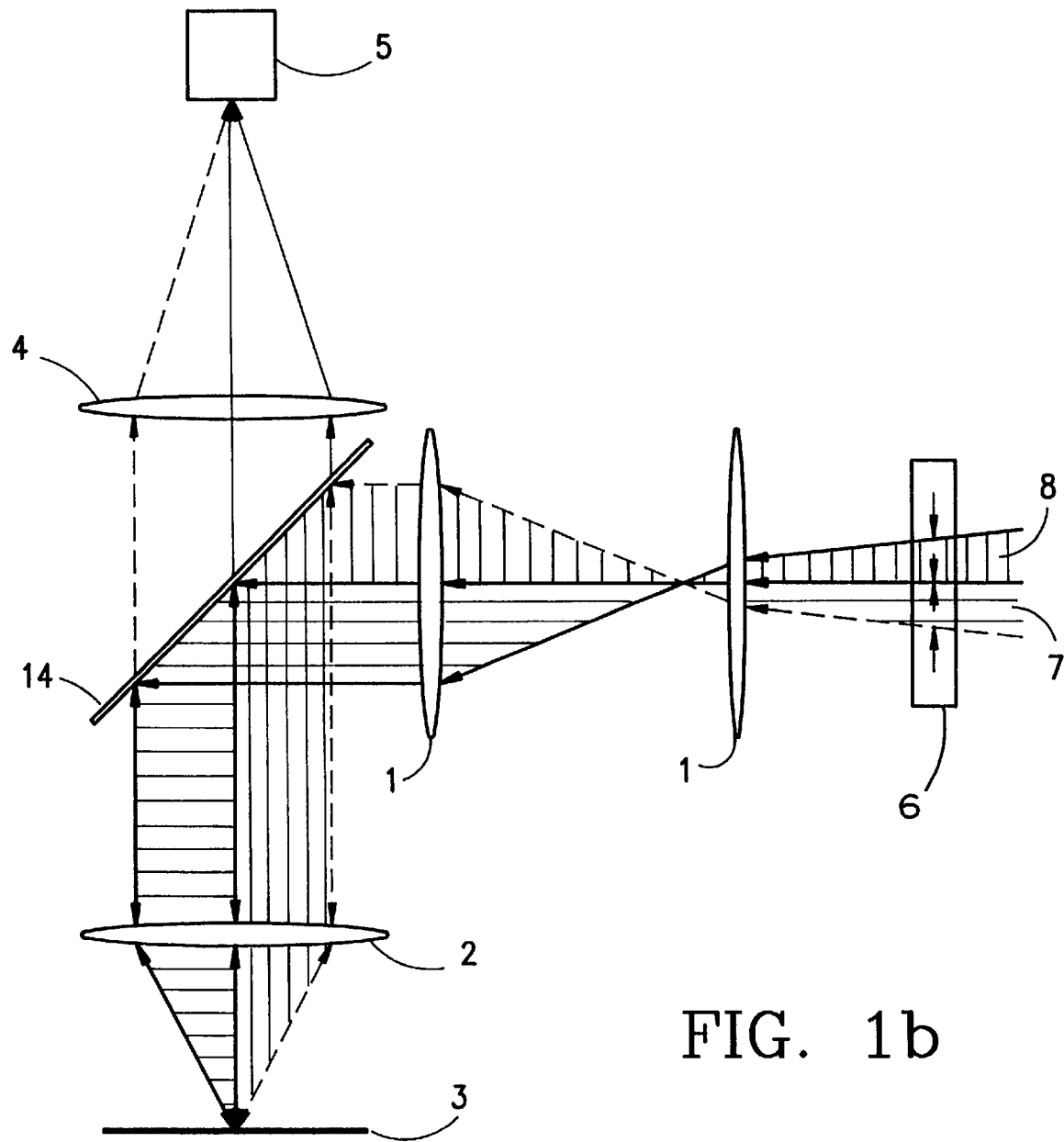
FIG. 1b is a schematic showing a microscope arrangement of the invention with reflected-light illumination.

FIG. 1b shows a microscope arrangement according to the invention in reflected-light illumination. The illuminating optics 1 illuminate the object 3 via a beam splitter 14. The component beams 7 and 8 reach the object with the angle required for stereo viewing.

Figure 2:
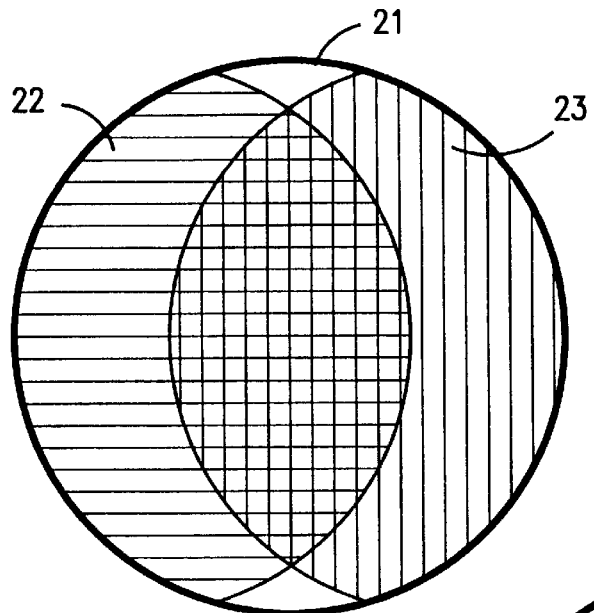
FIG. 2 shows the light conditions generated by an embodiment of the arrangement of the invention with the light conditions being shown in the plane of the aperture diaphragm of the microscope.

FIG. 2 shows the light conditions which the light modulator of the invention generates in the plane of the aperture diaphragm (or the image of the entry pupil of the objective). Reference numeral 21 identifies the entire entry pupil of the objective. In a first cycle, the area 22 of the entry pupil becomes light transmissive with the aid of the illuminating beam and, in the next cycle, the surface 23 of the entry pupil becomes light transmissive with the aid of the illuminating beam. The centroids of the respective bundles are adjustable within the illuminating aperture so that the object is illuminated at the angle required for the stereo viewing. The lunes which are possible hereby and which are greater than the half diaphragms cause the illuminating aperture to be utilized as optimally as possible and the viewing aperture remains unlimited so that a high microscopic resolution is achieved.

Figure 3:
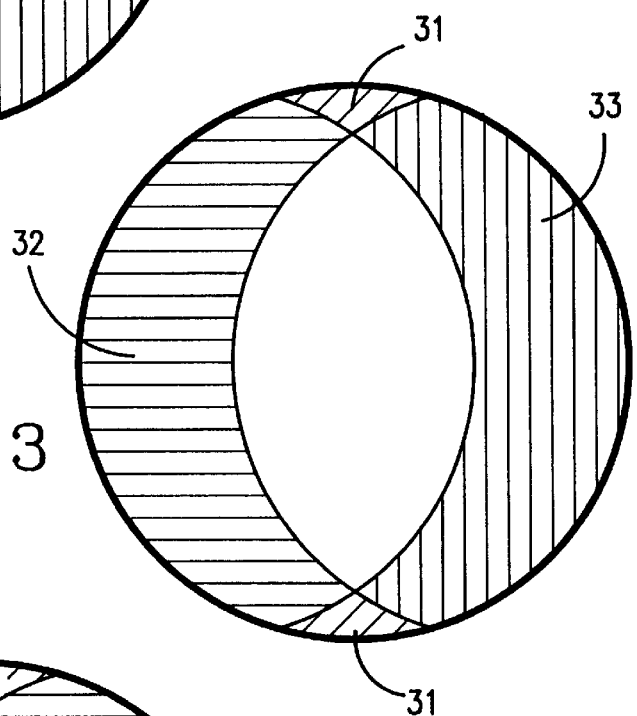
FIG. 3 shows the configuration of a liquid crystal cell for realizing the invention.

FIG. 3 shows the electrode configuration of a light modulator of the invention on the basis of a liquid crystal cell. The light beam 22 is realized by a suitable voltage on the transparent electrodes 31 and 33. In the next cycle, this voltage is applied to the electrodes 31 and 32 thereby realizing light beam 23. The use of liquid crystal cells also requires the use of a polarizer forward of the liquid crystal cell and an analyzer (not shown) downstream of the liquid crystal cell (not shown in FIG. 1).

A plate having a polarization-optical path difference $\lambda/4$ can be inserted after the analyzer in the illuminating beam path for objects with respect to which the azimuth dependency of the polarization light can be a disturbance.

To achieve stereoscopic viewing with high resolution with objectives of various aperture, the electrode structure of the liquid crystal cell can be so modified that, for the particular objective, an optimal relationship between resolution and stereoscopic effect is realized.

Figure 4:
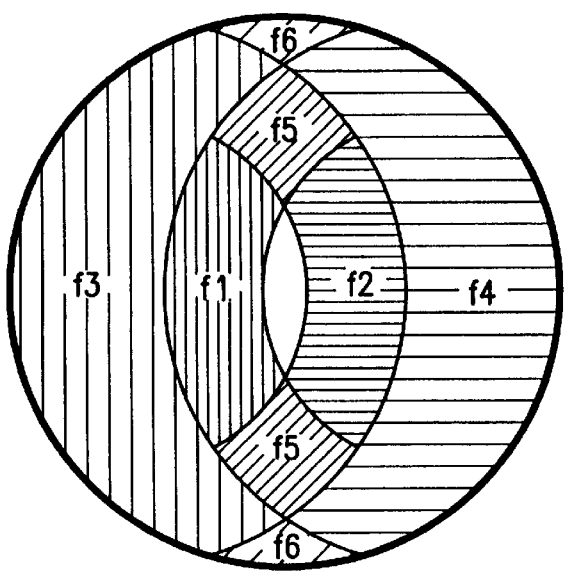
FIG. 4 discloses the configuration of a further liquid crystal cell having different regions for different objectives.

FIG. 4 shows an embodiment for two objectives having linear magnification different by a factor of 2. Here, the areas f3 and f4 for right and left as well as f6 are assigned to a first stronger objective and the areas f1+f3 and f2+f4 for right and left as well as f5+f6 are assigned to a weaker objective.

It is advantageous here to use a coded lens turret so that the corresponding electrode configuration of the light modulator is selected when exchanging objectives.

Figure 5A:
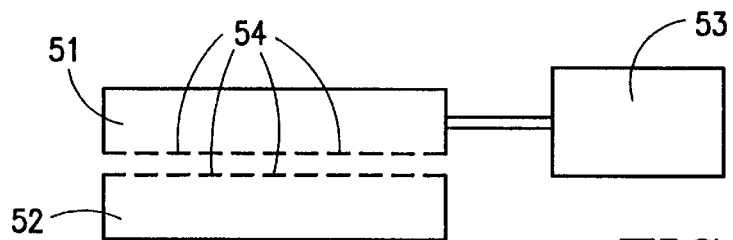
FIGS. 5a, 5b and 5c disclose an arrangement for generating the component beams of the illumination with two groove gratings.

In order to obtain a flicker-free image, the use of ferroelectric liquid crystal switches and the display of the two images on the monitor as sectional images (for example, left image: (2n)th lines; right image: (2n-1)th lines) is advantageous. A relatively simple possibility for modulating the entry pupil is afforded by the use of a modulator 6 having two groove gratings which are arranged closely one above the other and are divided in the ration of 1:1. This arrangement is shown schematically in FIG. 5. The lines 54 of the grating 51 and of the counter grating 52 are orientated to run from top to bottom and one of the two gratings, here 51, is moved by an actuator 53 by one half grating constant to the right and left relative to the other grating. The drive is then so configured that mutually opposing accelerating forces occur in order to avoid vibrations and thereby avoid "blurring" of the stereo effect.

Figure 5B:
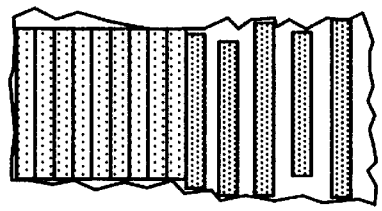
Figure 5C:
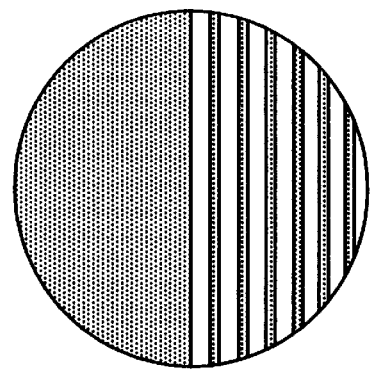

In one of the two gratings, and for the simplest case, the grating lines 54 in one pupil half are displaced by one half grating constant relative to the other pupil half. Because of the grating movement, alternately one of the two pupil halves (as shown in FIG. 5b and 5c) is covered while the other is transparent.

Patterns corresponding to FIG. 3 are also possible. The display of the image takes place in the same manner as in the above-described variants.

Figure 6:
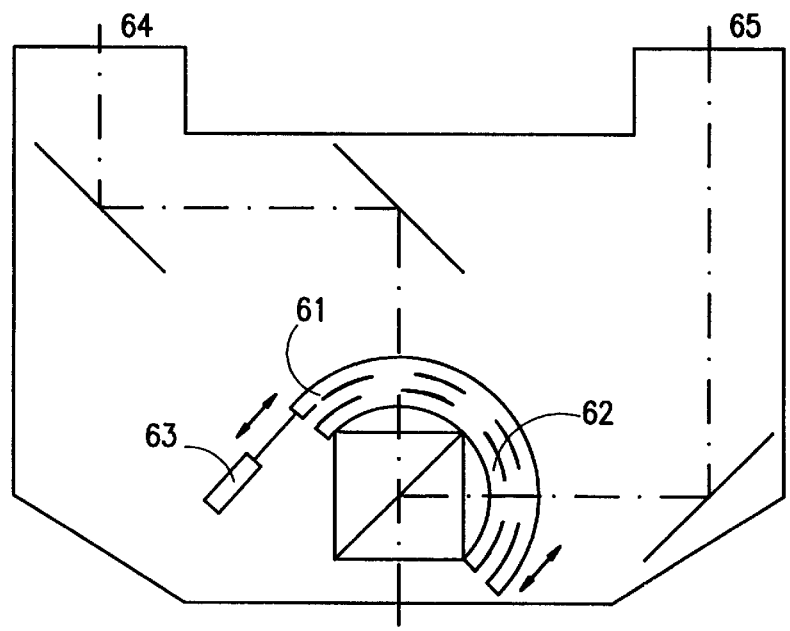
FIG. 6 shows the disposition of the beam paths in a binocular tube.

This principle can be modified and applied in binocular tubes for direct stereoscopic viewing. One such arrangement is shown in FIG. 6. Here, the grating constant of grating 61 and the grating constant of counter grating 62 are so selected that the diffraction images generated by these gratings do not become superimposed on the desired image in a disturbing manner.

A dimensioning usable for practical applications is a grating constant of approximately 3 μm for a field of view diameter of approximately 23 mm and optical tube lengths of 160 mm. The actuator 63 moves the grating by ½ grating constant. The tube openings (64, 65) are covered over the entire area and are cleared alternately in synchronism with the modulation of the entry pupil. An embodiment is shown in FIG. 6.

The invention is not tied only to the embodiments shown. For generating the displaced component beams, at least one rotating diaphragm is provided and arranged in the plane of the aperture diaphragm. An assignment of the component beams of the illumination to the eye of the viewer in synchronism with the rotational frequency takes place with the means shown above.

Objects can be viewed for which a change of the illuminating and viewing plane is purposeful and advantageous such as in areas of surgery utilizing a surgical microscope or colposcope. In these cases, means can be provided for rotating the openings (which clear the component beams) and the camera about the optical axis. The orientation of the viewed image is correspondingly adapted, for example, at the viewed video image.

Rotating discs can be used as shutters in binocular tubes in order to reduce the light losses caused by the polarizer-analyzer combination of an LCD-cell as a viewing shutter.

Various advantageous variations are possible. Thus, the illuminating shutter can be a rotating disc having alternately transparent and light impermeable areas.

Figure 7:
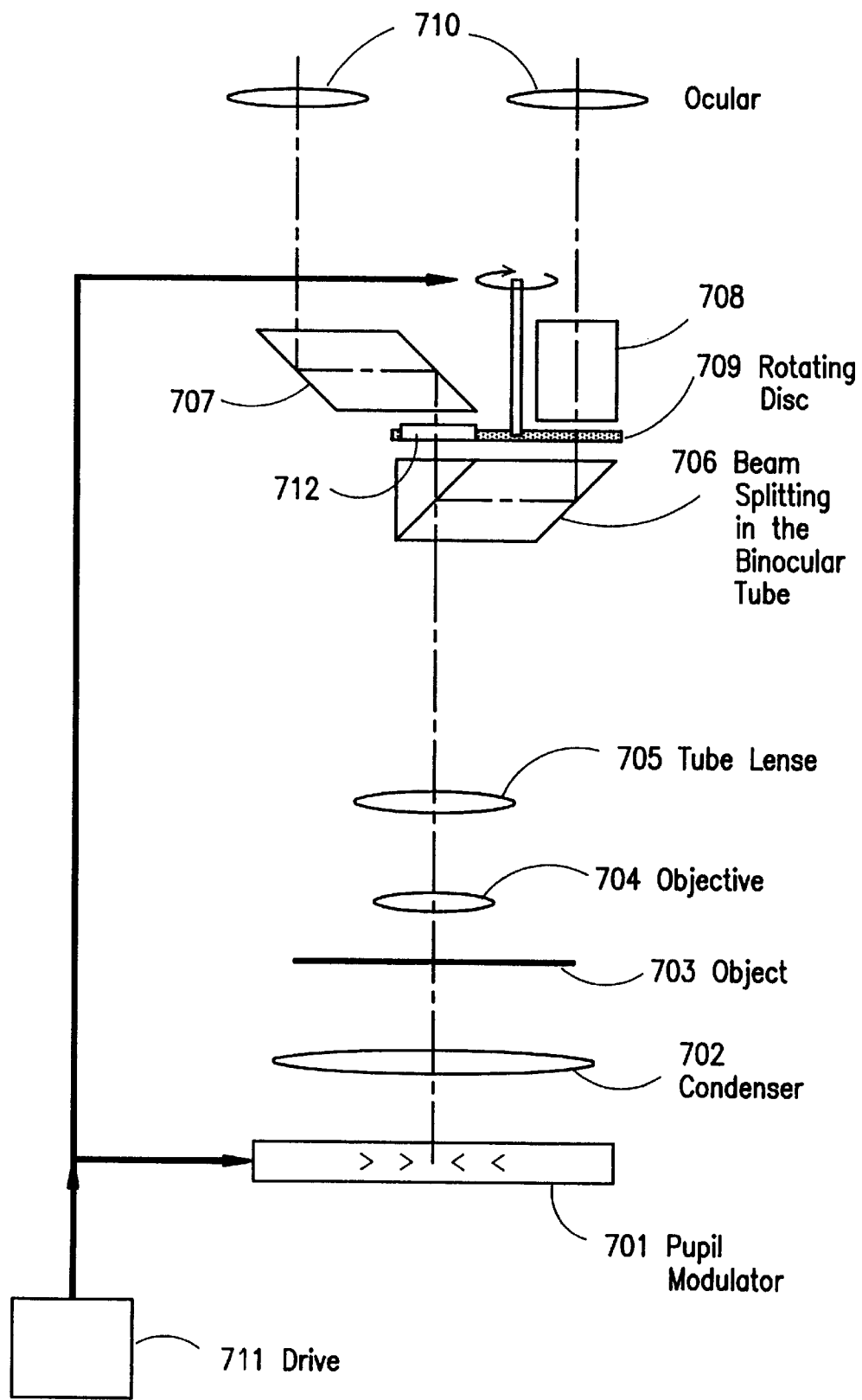
FIG. 7 shows a rotating disc for image separation mounted in the binocular tube.

Such an arrangement is shown in FIG. 7. A condenser 702 and an object 703 are mounted downstream of a pupil modulator 701 of the invention (shown for example in FIGS. 1 to 3) in the transmitted-light beam of a light source (not shown).

The object 703 is through-transmitted alternately from different directions. This object is imaged via an objective 704 as well as a tube lens 705 in the direction of a binocular tube (not shown) of a microscope. This binocular tube contains a beam splitter 706 and a rotating disc 709 is mounted downstream thereof. The disc 709 has a light-transmitting opening 712 and is otherwise configured as being light impermeable. Respective oculars 710 of the microscope are mounted downstream of a deflecting prism 707 and a compensating glass 708. A drive and synchronizing unit 711 effects the synchronization of the beam switchover in the pupil modulator 701 with the rotation of the disc 709 so that, by means of the light pass-through opening which clears only one ocular at a time, the different illuminating directions are offered laterally correct to the eye.

Figure 8:
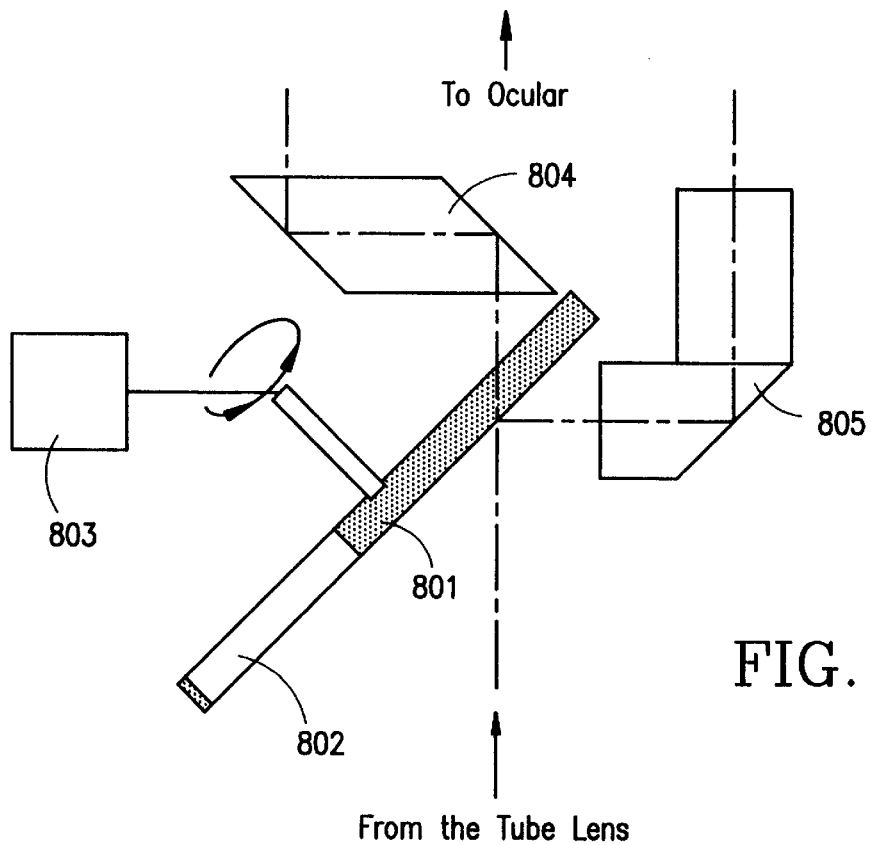
FIG. 8 is a further embodiment equipped with a rotating disc.

A disc having transparent and reflecting areas for assigning the component beams to the oculars is shown in FIG. 8. The disc carries these areas in different configurations.

Figure 11:
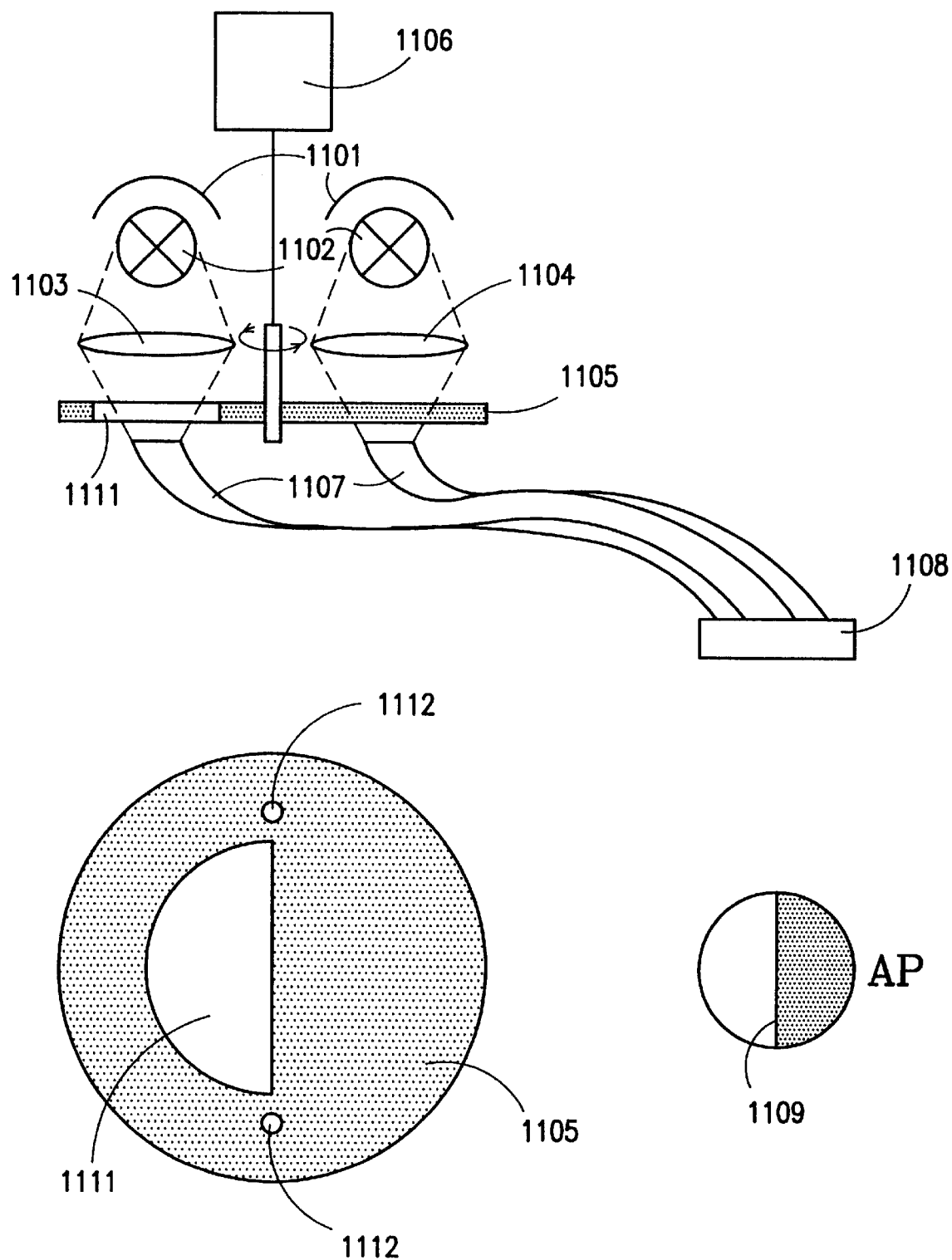
FIG. 11 is an embodiment of the illumination with two light sources.

Furthermore, characterizing marks can be provided as shown in FIG. 11 to provide synchronization in the arrangements according to FIGS. 7, 8, 9 and 12. With the characterizing marks, the trigger signal for the synchronous switching of the viewing shutter is obtained via a photodiode photoreceiver combination.

A rotating disc 801 is connected to a drive and Synchronization unit 803 and mounted diagonally in the beam path coming from the tube lens (not shown). The disc 801 is configured so as to be reflective on its side lying opposite a light pass-through opening 802 viewed toward the rotational axis, so that, with rotation of the disc, the light is alternately assigned to two deflecting prisms (804, 805) and the oculars (not shown).

Figure 9:
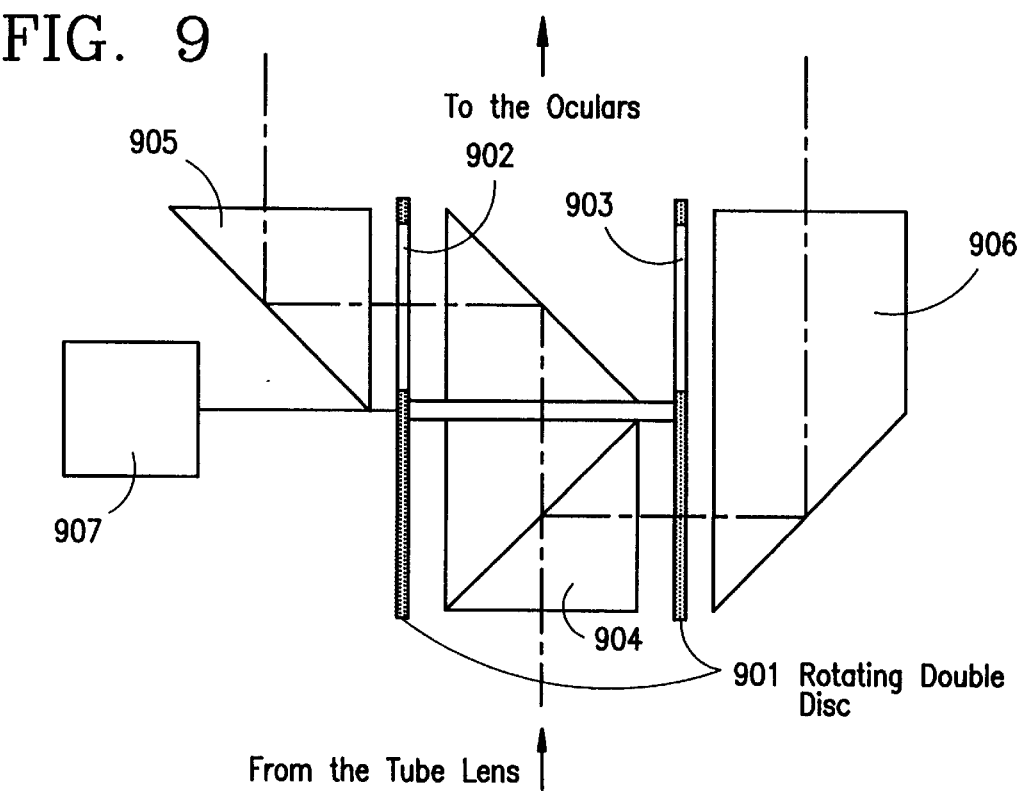
FIG. 9 is an embodiment having rotating twin discs.

In FIG. 9, a rotating double disc 901 having parallel mutually opposite lying areas (902, 903) is provided. The areas (902, 903) are respectively transparent and impermeable to light. The rotating double disc 901 is connected to a drive and synchronization unit 907.

For the position of the double disc 901 shown, the light coming from the tube lens (not shown) reaches a first beam deflecting prism 905 as well as a second beam deflecting prism 906 via a beam splitter 904. The second beam deflecting prism 906 is reached for a position of the double disc displaced by 90°. In this way, the light emanating from the tube lens is alternately assigned to the oculars in synchronism with the change of the illumination.

Figure 10:
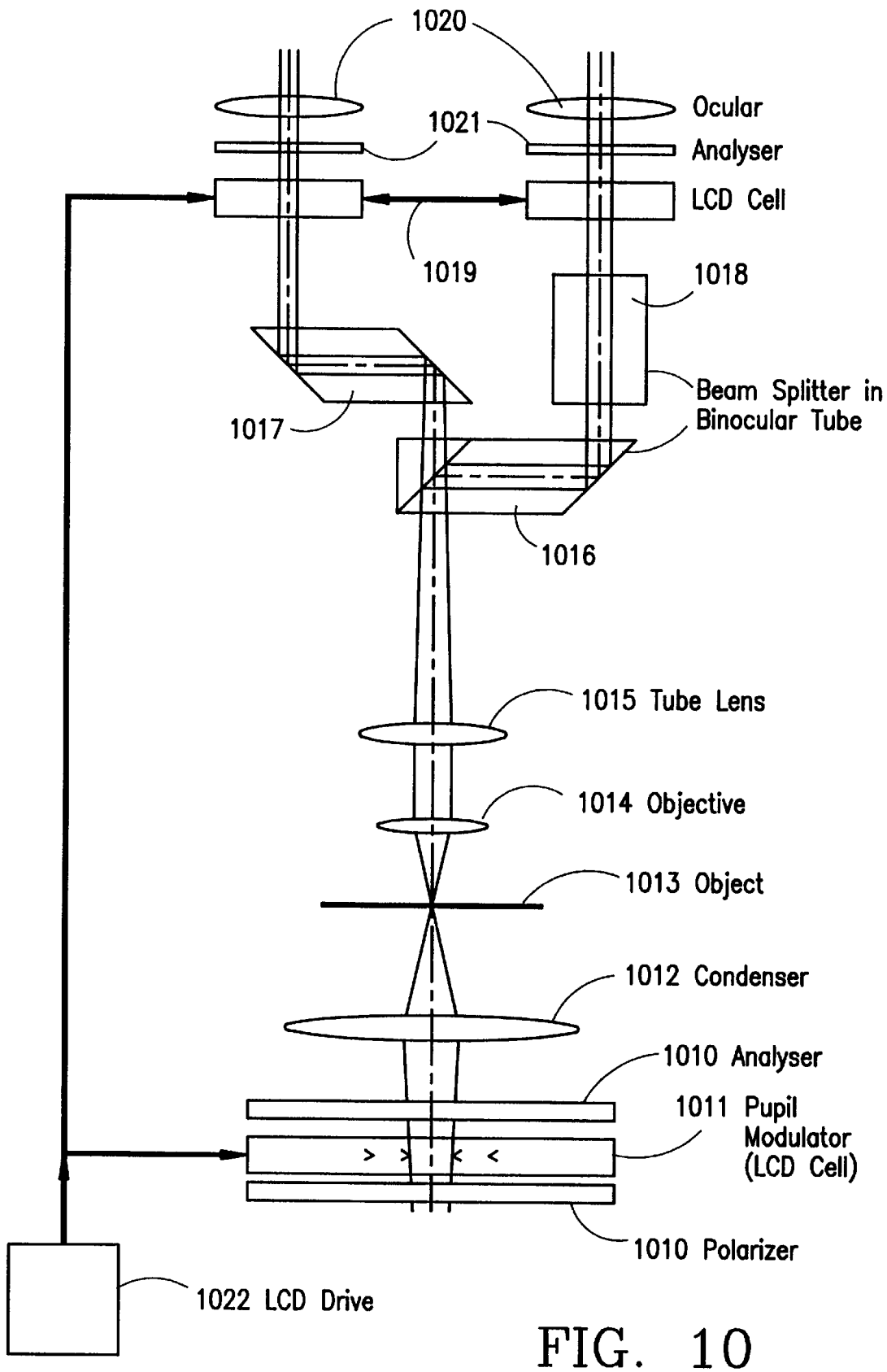
FIG. 10 shows the arrangement of LCD-cells arranged forward of the ocular.

As shown in FIG. 10, an LCD-cell can be inserted into the binocular tube for each eye as a viewing shutter.

If the viewing shutter is also an LCD-cell, then each LCD-cell requires a polarizer-analyzer combination. However, these four units result in relatively high light losses for each beam path. The optical elements between illuminating shutter and viewing shutter can have advantageous polarization optical characteristics (that is, the effects of the optic on linearly polarized light in the beam path is approximately the same for the left and right eyes) because slight phase jumps occur and the optics used are substantially free of tension. In this situation, the analyzer of the illuminating shutter can operate as polarizer for the viewing shutter so that one unit is omitted.

In FIG. 10, the following are shown: a polarizer/analyzer arrangement 1010 in which an LCD-cell 1011 is mounted in the light path as a pupil modulator according to the invention. A condenser 1012 as well as the object 1013 are mounted downstream of the polarizer/analyzer arrangement 1010.

As already described, an objective 1014 as well as a tube lens 1015 are mounted downstream of the object.

A beam splitter 1016, which is mounted in the binocular tube (not shown) of a microscope, a deflecting prism 1017 as well as a compensating glass 1018 generate the beam paths in the oculars 1020.

An LCD-cell 1019 and analyzers 1021 are mounted downstream of the oculars 1020. The LCD-cell 1019 alternately clears the right and left beam path.

The synchronized control of the clearance of the beam paths in the LCD-cell 1011 as well as of the LCD-cell takes place via a control and synchronization unit 1022. In this way, the different illuminating angles are assigned to the eyes of the viewer.

A further embodiment of the invention is shown in FIG. 11. In this embodiment, the light losses caused by the polarization-analyzer combination of an LCD-cell as an illuminating shutter are reduced by utilizing two light sources having light which is imaged, according to the invention, into the plane of the entry pupil of the objective or into a plane conjugated to this plane. For this purpose, almost the entire light of each light source is imaged onto the circularly-shaped inlet of the light conductor fiber bundle. Each light conductor fiber bundle is configured as a cross section converter so that each light exit face has a semicircular shape. The exit faces are put together to a full circle and define the plane of the entry pupil (aperture diaphragm plane) or a conjugated plane. Each light beam is switched by a rotating shutter before the light enters into the light conducting fiber bundle. The rotating shutter can, for example, be configured as a semicircular sector. At the same time, the rotating shutter carries characterizing marks via which the trigger signal for the synchronous switching of the viewing shutter is obtained via a photodiode-photoreceiver combination. The rotating shutter is assigned to the cold-light source. For this reason, a mechanical separation from the microscope stand is provided so that no possible mechanical vibrations of the rotor can act on the microscope stand.

In FIG. 11, light sources 1102 having reflectors 1101 are provided. The light sources illuminate via respective imaging optics (1103, 1104) a rotating disc 1105. A semicircularly-shaped light passthrough opening 1111 is provided in the disc 1105 which is otherwise impermeable to light. In this way, the light is alternately allowed to incident upon light entry faces of two light conductor bundles 1107. The light-conductor exit beams are each configured to have a semicircular shape in accordance with the illustration of the aperture diaphragm plane 108. The light conductor exit beams generate the image 1109 in the plane of the aperture diaphragm. The image 1109 is alternately bright or dark to the right and alternately bright or dark to the left. At the same time, the disc 1105 has measurement marks 1112 which are configured as small openings and generate a synchronization signal for a drive and synchronization unit 1106. This signal is generated by means of a photodiode-photoreceiver combination which is not shown.

Figure 12:
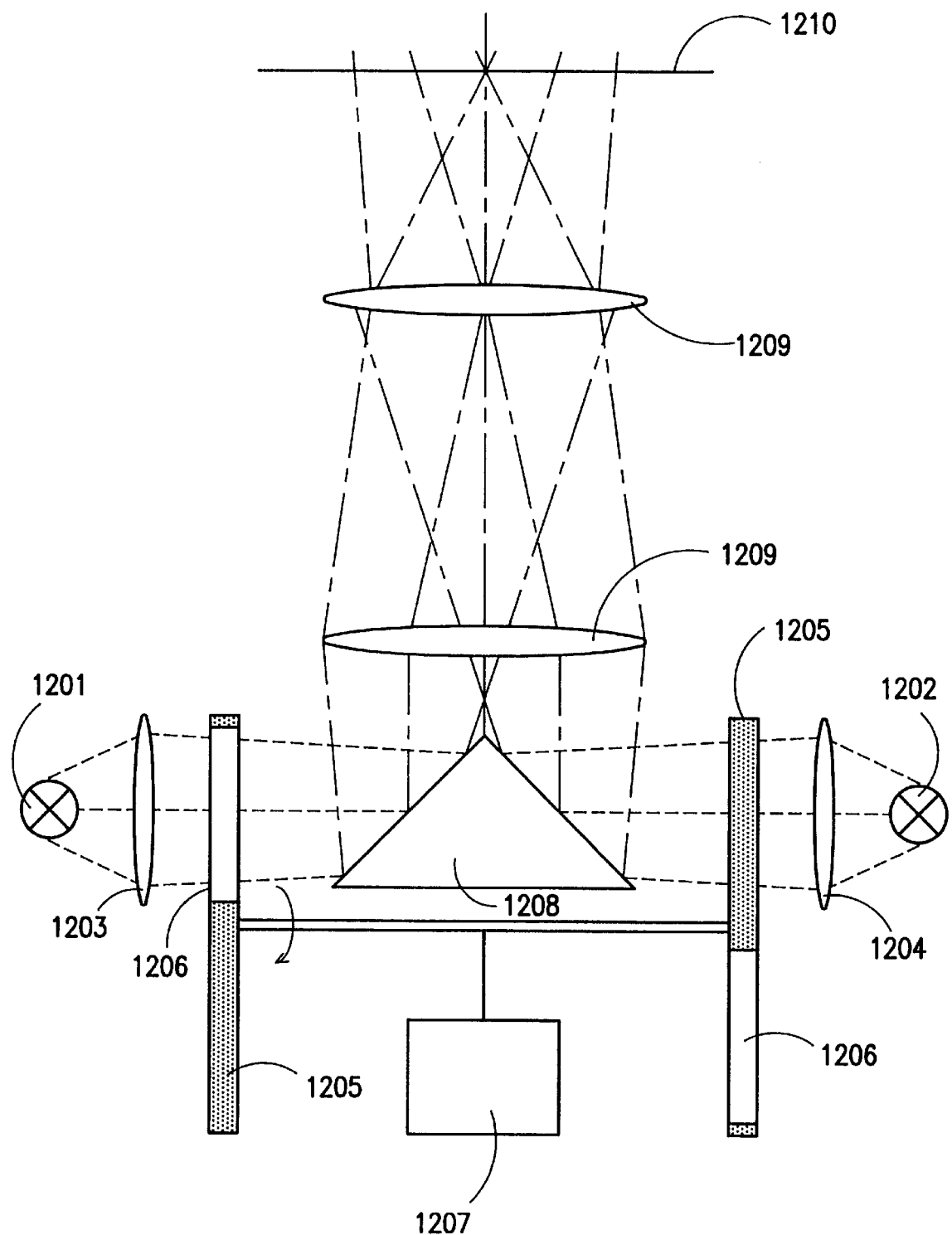
FIG. 12 is a further embodiment of the illumination with two light sources; and, FIGS. 13 to 15 show additional advantageous arrangements for assigning the component beam paths to the eyes of the viewer.

In order to reduce the light losses produced by the polarizer-analyzer combination of an LCD-cell as an illuminating shutter, it is advantageous to image two light sources via respective lenses onto corresponding short faces of a mirrored prism as shown in FIG. 12. The tip of the prism is either the plane of the entry pupil (aperture diaphragm plane) or imaging into the entry pupil of the microscope takes place via an additional lens combination. The illuminating shutter is defined by a rotating double disc. The rotating double disc furthermore has characteristic markings via which the trigger signal for the synchronous switching of the viewing shutter is obtained. The trigger signal is obtained utilizing a photodiode-photoreceiver combination.

In FIG. 12, imaging optics (1203, 1204) are mounted downstream of corresponding individual light sources (1201, 1202). A rotating double diaphragm 1205 has two light pass-through openings 1206 displaced by 180° and each disc is otherwise impermeable to light so that the light of only one light source reaches the corresponding side face of the prism 1208 at a time. The particular light beam is reflected from the prism surface corresponding thereto and reaches the object plane 1210 via an illuminating optic 1209 whereby the object is sequentially illuminated at different angles.

A drive and synchronization unit synchronizes the movement of the double disc 1205 by suitable means described previously for image separation in the viewing plane.

Figure 13:
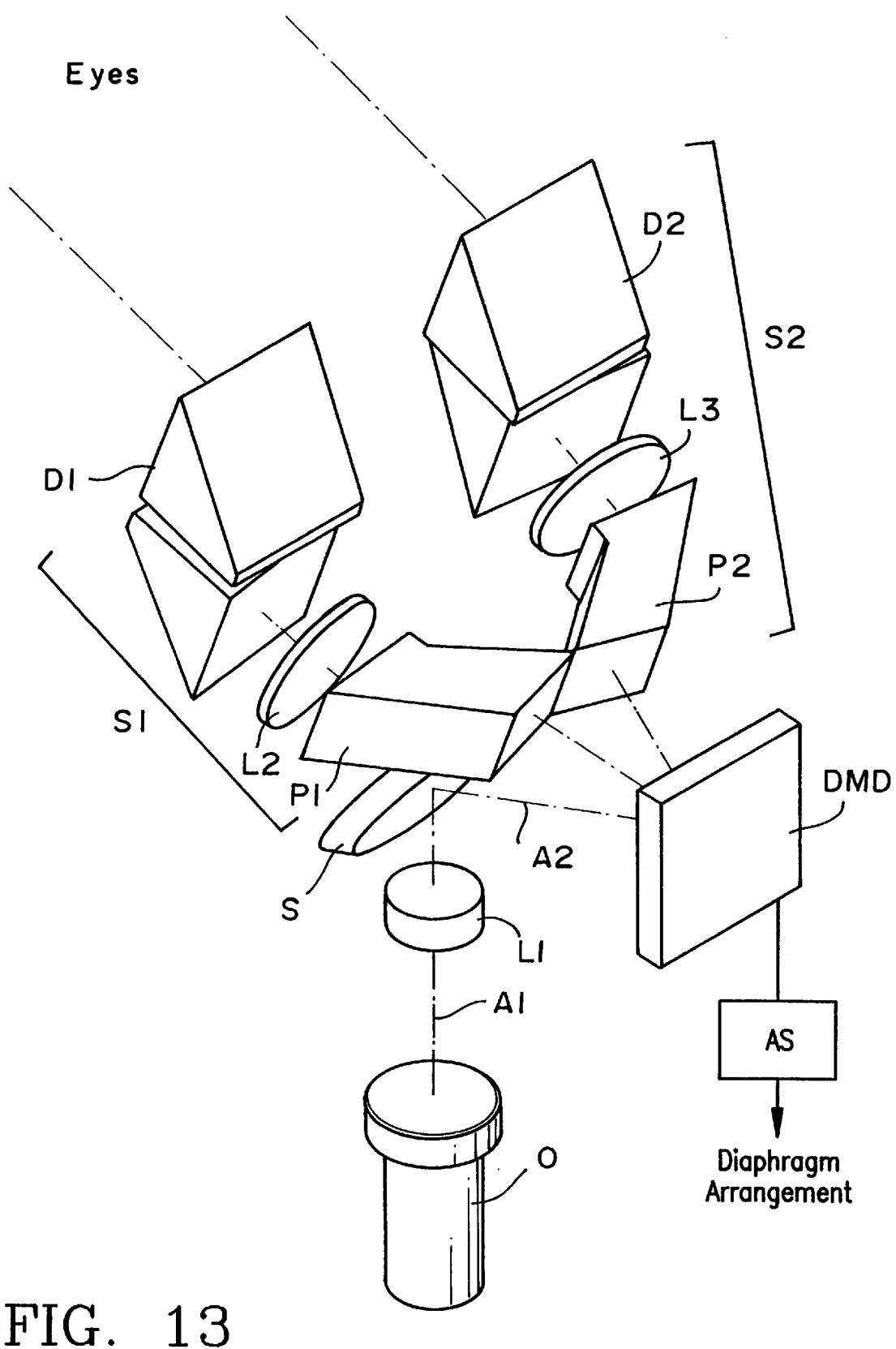

In FIG. 13, two stereo beam paths pass through an objective O and are generated by alternately illuminating the object. The stereo beams are generated (for example, as explained above) by alternately exposing diaphragms in the plane of the entry pupil of the objective of a transmitted-light microscope. A tube lens L1 and a mirror S are arranged downstream of the objective O.

So-called digital micromirror devices (DMD) are known which comprise a plurality of micromirrors having angular positions which can be electrostatically changed. The assembly and operation of such devices are disclosed in European patent publications 0,664,470; 0,656,554; and, 0,601,309; as well as in U.S. Pat. Nos. 5,382,961; 5,444,566; and, 5,285,196. Such arrangements can be, unexpectedly, advantageous also for the generation of stereoscopic images in microscopes.

For this purpose, the DMD-chip is positioned either non-orthogonally or orthogonally (perpendicular) in an intermediate plane, which, in its size, is dimensioned via the focal length of the tube lens or is brought into the parallel beam path between objective and tube lens.

The intermediate image on the DMD-chip is imaged via a suitable optic into the ocular intermediate image, that is, in the parallel beam path, the ocular intermediate image is generated by a suitable optic after the DMD-chip. Prism or mirror deflectors are provided between the two images and these deflectors ensure an upright laterally correct image in the pupillary distance required for the particular user.

Pupil control and DMD-switching are clocked synchronously so that the left and right eyes of the viewer are provided with an image of the stereoscopic image pair.

The variants described in the following are likewise suitable for transmitted-light microscope stands and reflected-light microscope stands and are also suitable for inverse microscopes and for use in endoscopy.

An intermediate image of the viewed object occurs on a digital mirror device arrangement (DMD) and the intermediate image is alternately reflected into a left optical system S1 and a right optical system S2 via electrostatic control of the micromirrors. The system S1 comprises a prismatic body P1, lens L2 as well as the double prism D1 which deflects to one of the viewer eyes. The system S2 comprises a prismatic body P2, lens L3 and a double prism D2 which reflects to the other viewer eye.

The DMD-chip then lies at an angle unequal to 90° to the objective axis A1 as well as to axis A2 generated by the element S by deflection.

By means of drive unit AS, the DMD-arrangement as well as the diaphragm arrangement (not shown) are synchronously driven in the entry pupil of the objective at a frequency above the flicker frequency of the eye.

Figure 14:
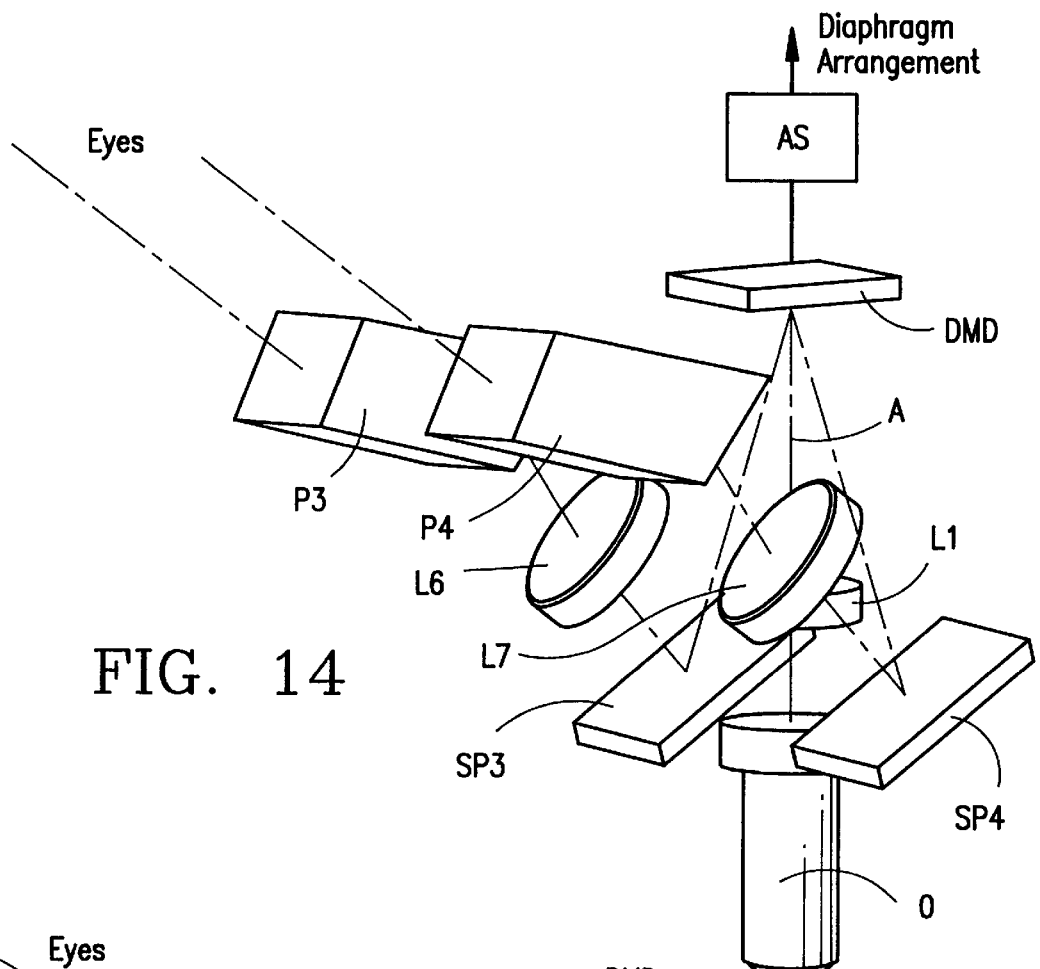

In FIG. 14, the DMD-element is arranged perpendicularly to objective axis A in the intermediate image of the tube lens L1 and alternately deflects the beam path to deflecting mirrors Sp3, Sp4 arranged in the beam path symmetrical to axis A. The lens L6 and prism P3 are arranged downstream of deflecting mirror Sp3 for deflecting in the direction of the ocular as well as for generating the ocular intermediate image. Likewise, the lens L7 and prism P4 are arranged downstream of deflecting mirror Sp4 for deflecting in the direction of the ocular as well as for generating the intermediate image.

A further deflecting element (not shown) can be provided between tube lens L1 and the DMD-arrangement. Here too, a drive unit AS operates as in FIG. 7.

Figure 15:
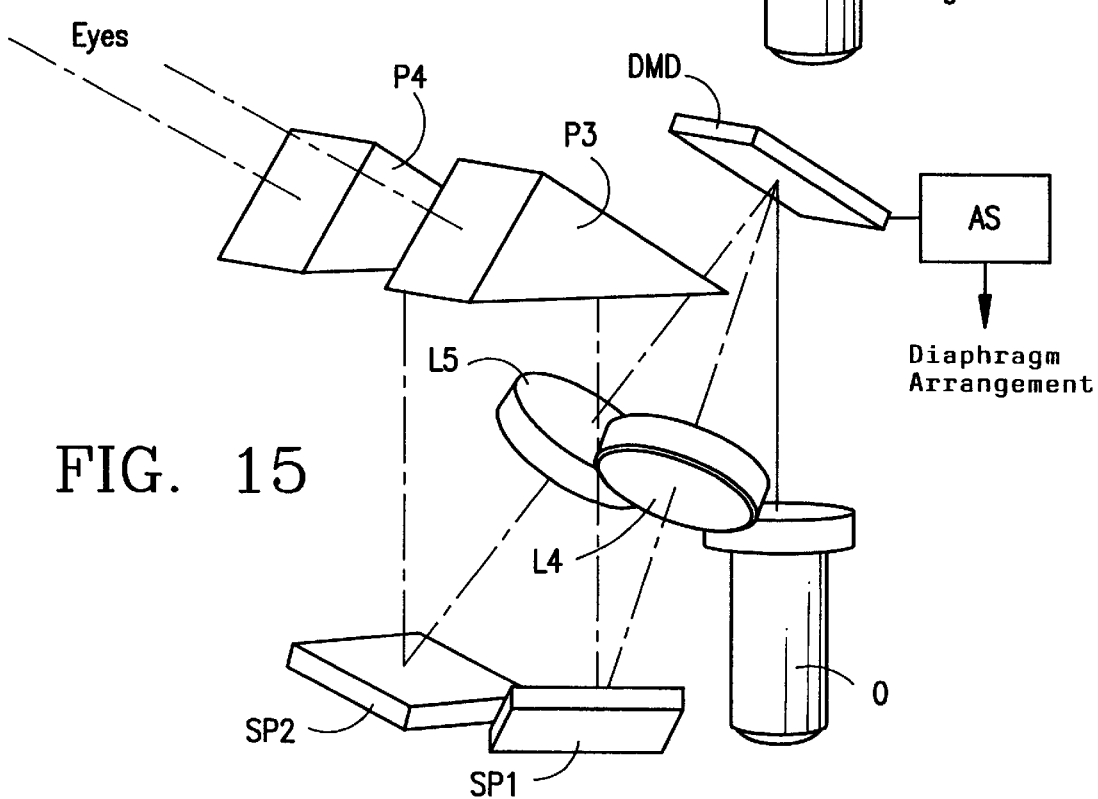

In FIG. 15, the DMD-element is arranged directly downstream of the objective O in the parallel beam path and alternately generates a beam path through tube lens L4, deflecting mirror Sp1 and prism P3 and through tube lens L5, deflecting mirror Sp2 and prism P4. The ocular intermediate image is produced downstream of prisms P3, P4 and is viewed by means of ocular optics (not shown).

Here too, a drive unit AS is provided.

Adequate pivot angles are realized by means of the DMD-arrangement in order to generate the required angle difference.

An arrangement similar to FIGS. 13 to 15 can also be provided by utilizing a galvanometer mirror which deflects the entire beam path in lieu of the DMD-arrangement.

The uninterrupted beam path to a television camera and an alternate monitoring viewing is possible by switching out the first deflecting mirror S in FIG. 13 or the DMD-chips in FIGS. 14 and 15. The monitor viewing makes possible a stereo viewing synchronizing pupil illumination, camera and image display.

It is understood that the foregoing description is that of the preferred embodiments of the invention and that various changes and modifications may be made thereto without departing from the spirit and scope of the invention as defined in the appended claims.

What is claimed is:

1. An arrangement for stereoscopically viewing an object, the arrangement comprising:

illuminating optics for illuminating said object with an illuminating beam;

a beam generating device for alternately generating first and second illuminating beams components which illuminate said object via said illuminating optics at respectively different angles to produce respective images of said object;

a directing device for alternately directing said images to the left and right eyes of a viewer at a frequency above the flicker frequency of the human eye;

a microscope apparatus defining an optical axis and including a light source;

said illuminating optics and at least one objective on said axis for imaging said object;

said microscope apparatus defining a plane of an aperture diaphragm; and, said beam generating device being arranged in said plane or in a plane optically conjugated to said plane of an aperture diaphragm.

2. The arrangement of claim 1, said first and second illuminating beam components conjointly defining an angle which corresponds approximately to the stereo viewing angle of said viewer.

3. The arrangement of claim 1, said objective defining an entry pupil plane; and, said beam generating device being mounted in said entry pupil planes.

4. The arrangement of claim 1, said light source and said illuminating optics conjointly defining a transmitted-light illuminating device for generating a transmitted-light illuminating beam directed toward said objective.

5. The arrangement of claim 1, said microscope defining a viewing beam path directed along said optical axis; said illuminating optics including a partially transmitting mirror mounted in said viewing beam path; and, said illuminating optics coacting with said mirror to provide a reflected-light illumination of said object.

6. The arrangement of claim 5, said optical device being adapted to cause each of said first and second illuminating beams to have a cross section which is greater than half of the optically effective illuminating area.

7. The arrangement of claim 6, said optical device being adapted to produce said first and second illuminating beam components by masking said illuminating beam.

8. The arrangement of claim 1, said beam generating device including a liquid crystal cell having electric drivable component regions which are alternately permeable to light.

9. An arrangement for stereoscopically viewing an object, the arrangement comprising:

illuminating optics for illuminating said object with an illuminating beam;

a beam generating device for alternately generating first and second illuminating beam components which illuminate said object via said illuminating optics at respectively different angles to produce respective images of said object;

a directing device for alternately directing said images to the left and right eyes of a viewer at a frequency above the flicker frequency of the human eye;

said beam generating device including a liquid crystal cell having electric drivable component regions which are alternately permeable to light; and, different electrically drivable component regions of said liquid crystal cell being provided to adapt to different imaging objectives.

10. The arrangement of claim 9, wherein a plate having a polarization-optical path difference $\lambda/4$ is mounted in the beam path of said liquid crystal cell.

11. An arrangement for stereoscopically viewing an object, the arrangement comprising:

illuminating optics for illuminating said object with an illuminating beam;

a beam generating device for alternately generating first and second illuminating beam components which illuminate said object via said illuminating optics at respectively different angles to produce respective images of said object;

a directing device for alternately directing said images to the left and right eyes of a viewer at a frequency above the flicker frequency of the human eye; and, said beam generating device including two groove gratings mounted so as to be displaceable relative to each other; and, the grating lines of said groove gratings being displaced relative to each other so that different component regions of the grating arrangement are alternately light transmissive when said groove gratings are displaced.

12. The arrangement of claim 11, wherein: on at least a first one of said groove gratings, the grating lines of a component region are displaced relative to the grating lines of a second component region by ½ grating constant and a displacement of the first groove grating relative to the second groove grating by ½ grating constant results.

13. The arrangement of claim 1, said beam generating device including at least one rotating diaphragm having at least one opening which alternately clears a beam component.

14. An arrangement for stereoscopically viewing an object, the arrangement comprising:

illuminating optics for illuminating said object with an illuminating beam;

a beam generating device for alternately generating first and second illuminating beam components which illuminate said object via said illuminating optics at respectively different angles to produce respective images of said object;

a directing device for alternately directing said images to the left and right eves of a viewer at a frequency above the flicker frequency of the human eye; and, a transmitting optic for generating an image of a light source arrangement in the plane of the aperture diaphragm or in a plane optically conjugated to said plane of the aperture diaphragm.

15. The arrangement of claim 14, wherein said transmitting optic comprises light conductors.

16. The arrangement of claim 14, wherein said transmitting optic comprises a mirrored prism which is mounted in the illuminating beam path and reflects the light source arrangement into the beam path.

17. The arrangement of claim 1, said directing device comprising a video camera and a display mounted downstream of said video camera; and, said display being adapted to display the images of said object clocked to the alternating illumination of said object.

18. An arrangement for stereoscopically viewing an object, the arrangement comprising:

illuminating optics for illuminating said object with an illuminating beam;

a beam generating device for alternately generating first and second illuminating beam components which illuminate said object via said illuminating optics at respectively different angles to produce respective images of said object;

a directing device for alternately directing said images to the left and right eyes of a viewer at a frequency above the flicker frequency of the human eye;

said directing device comprising a video camera and a display mounted downstream of said video camera; and, said display being adapted to display the images of said object clocked to the alternating illumination of said object; and, said video camera being mounted in the beam path of a microscope downstream of the imaging optic.

19. The arrangement of claim 1, comprising spectacles for a viewer viewing a display and said spectacles being clocked to the alternating illumination of said object to assign an image to each eye.

20. The arrangement of claim 19, said spectacles being shutter spectacles with switchable apertures for the right and left eyes.

21. The arrangement of claim 19, said spectacles being polarization spectacles; and, further comprising a polarization filter switchable in clocked sequence to the alternating illumination.

22. The arrangement of claim 17, wherein a separate display is provided forward of each eye and the displays are assigned clocked to the alternating illumination of said object.

23. An arrangement for stereoscopically viewing an object, the arrangement comprising:

illuminating optics for illuminating said object with an illuminating beam;

a beam generating device for alternately generating first and second illuminating beam components which illuminate said object via said illuminating optics at respectively different angles to produce respective images of said objects;

a directing device for alternately directing said images to the left and right eyes of a viewer at a frequency above the flicker frequency of the human eye; and, images of the object being displayed alternately to the right and left eye of the viewer by assigning tube apertures in the binocular tube of a microscope clocked to the alternating illumination of said object.

24. The arrangement of claim 23, said binocular tube being assigned shutter spectacles.

25. The arrangement of claim 23, wherein at least two mutually displaceable groove gratings are arranged in the binocular tube and the grating lines of said gratings are offset relative to each other so that different component regions of the grating arrangement become transmissive to light when said gratings are displaced with said component regions respectively clearing a tube aperture.

26. The arrangement of claim 25, wherein a beam splitter is mounted in the binocular tube for splitting in the beam paths for the left and right eyes; and, said groove gratings being mounted downstream of said beam splitter.

27. The arrangement of claim 26, wherein: on at least a first one of said groove gratings, the grating lines of a component region are displaced relative to the grating lines of a second component region by ½ grating constant and a displacement of the first groove grating relative to the second groove grating by ½ grating constant results.

28. An arrangement for stereoscopically viewing an object, the arrangement comprising:

illuminating optics for illuminating said object with an illuminating beam;

a beam generating device for alternately generating first and second illuminating beam components which illuminate said object via said illuminating optics at respectively different angles to produce respective images of said object;

a directing device for alternately directing said images to the left and right eyes of viewer at a frequency above the flicker frequency of the human eye;

said illuminating optics defining an optical axis and said illuminating beam components illuminating respective areas in a plane perpendicular to said optical axis; and, said beam generating device being adapted to rotate said areas about said optical axis.

29. The arrangement of claim 1, wherein said beam generating device comprises at least one rotating diaphragm having at least one aperture for alternately clearing one of said beam components is provided in the viewing beam path to alternately generate said beam components.

30. An arrangement for stereoscopically viewing an object, the arrangement compromising:

illuminating optics for illuminating said object with an illuminating beam;

a beam generating device for alternately generating first and second illuminating beam components which illuminate said object via said illuminating optics respectively different angles to produce respective images of said object;

a directing device for alternately directing said images to the left and right eyes of a viewer at a frequency above the flicker frequency of the human eye; and, a tilt mirror arrangement being provided between an objective and a binocular tube for alternately assigning stereoscopic component beam paths to the left and right viewing eyes of the viewer.

31. The arrangement of claim 30, wherein the stereoscopic images are generated via a microscope system by rapid alternating masking of said beam components; and, the stereoscopic individual images are assigned to respective eyes of the viewer in the binocular tube by means of a tilt mirror in synchronism with said masking.

32. The arrangement of claim 31, said tilt mirror being a galvanometer mirror for a rapid assigning of the stereoscopic individual images.

33. The arrangement of claim 31, wherein a digital micromirror arrangement (DMD) is arranged in the imaging beam path between the objective and the tube unit.

34. The arrangement of claim 33, wherein said micromirror arrangement (DMD) is positioned in an intermediate image of the imaging beam path and not orthogonal to said optical axis.

35. The arrangement of claim 33, wherein said micromirror arrangement (DMD) is positioned in an intermediate image and orthogonal to said optical axis.

36. The arrangement of claim 35, wherein said micromirror arrangement (DMD) is positioned in the parallel part of the imaging beam path.

* * * * *

UNITED STATES PATENT AND TRADEMARK OFFICE
CERTIFICATE OF CORRECTION

PATENT NO. : 5,835,264
DATED : November 10, 1998
INVENTOR(S) : Hans Tandler, Gudrun Nordt, Reed Werlich, Karl-Heinz Grier, Johannes Knoblich and Guenter Schoeppe It is certified that error appears in the above-identified patent and that said Letters Patent is hereby corrected as shown below:

In column 1, line 55: delete "Wo" and substitute -- WO -- therefor.

In column 6, line 4: delete "Synchro-" and substitute -- synchro- -- therefor.

In column 9, line 31: delete "beams" and substitute -- beam -- therefor.

In column 9, line 53: delete "planes." and substitute -- plane. -- therefor.

In column 12, line 34: between "of" and "viewer", insert -- a--.

In column 12, line 54: between "optics" and respec-", insert -- at --.

Signed and Sealed this

Fourth Day of May, 1999

Attest:

Q. TODD DICKINSON

*Attesting Officer*      *Acting Commissioner of Patents and Trademarks*